(12) United States Patent
Perusek et al.

(10) Patent No.: US 7,562,677 B2
(45) Date of Patent: Jul. 21, 2009

(54) MODULAR SURFACE MOUNT FLUID SYSTEM

(75) Inventors: Robert V. Perusek, Madison, OH (US);
David J. Hasak, Concord, OH (US);
Gregory S. Kalata, Avon, OH (US);
Douglas A. Nordstrom, Shaker Heights, OH (US); Timothy Maruna, Chardon, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 11/881,595

(22) Filed: Jul. 27, 2007

(65) Prior Publication Data

US 2007/0267081 A1    Nov. 22, 2007

Related U.S. Application Data

(62) Division of application No. 10/721,312, filed on Nov. 25, 2003, now Pat. No. 7,258,139.

(60) Provisional application No. 60/429,088, filed on Nov. 26, 2002, provisional application No. 60/433,371, filed on Dec. 13, 2002.

(51) Int. Cl.
*F16K 11/10* (2006.01)
(52) U.S. Cl. ..................... 137/884; 251/367
(58) Field of Classification Search ........... 137/884; 251/367
See application file for complete search history.

(56) References Cited

U.S. PATENT DOCUMENTS

| | | | |
|---|---|---|---|
| 3,365,219 A | 1/1968 | Nicholaus | |
| 4,407,516 A | 10/1983 | Le et al. | |
| 4,807,660 A | 2/1989 | Aslanian | |
| 5,368,062 A | 11/1994 | Okumura et al. | |
| 5,488,925 A | 2/1996 | Kumada | |
| 5,605,179 A | 2/1997 | Strong, Jr. et al. | |
| 5,713,582 A | 2/1998 | Swensen et al. | |
| 5,730,448 A | 3/1998 | Swensen et al. | |
| 5,735,532 A | 4/1998 | Nolan et al. | |
| 5,735,533 A | 4/1998 | Nolan et al. | |

(Continued)

FOREIGN PATENT DOCUMENTS

EP    637712    2/1995

(Continued)

OTHER PUBLICATIONS

International Search Report from PCT/US03/37460, mailed Aug. 31, 2004.

(Continued)

*Primary Examiner*—John Fox
(74) *Attorney, Agent, or Firm*—Calfee, Halter & Griswold LLP

(57) ABSTRACT

A bridge fitting for use with two or more surface mounted components includes a housing having at least a first port disposed on a first side of the housing, at least a second port non-coaxial with the first port and disposed on a second side of the housing opposite the first side of the housing, and an internal fluid passageway connecting the first and second ports. The internal fluid passageway is configured to limit fluid flow within the bridge fitting to a single path between the first and second ports.

9 Claims, 8 Drawing Sheets

U.S. PATENT DOCUMENTS

| | | | |
|---|---|---|---|
| 5,836,355 A | 11/1998 | Markulec et al. | |
| 5,983,933 A | 11/1999 | Ohmi et al. | |
| 6,039,360 A | 3/2000 | Ohmi et al. | |
| 6,109,303 A * | 8/2000 | Itafuji et al. | 137/884 |
| 6,152,175 A | 11/2000 | Itoh et al. | |
| 6,283,155 B1 | 9/2001 | Vu | |
| 6,394,138 B1 | 5/2002 | Vu et al. | |
| 6,546,961 B2 | 4/2003 | Fukushima | |
| 6,629,546 B2 * | 10/2003 | Eidsmore et al. | 137/884 |
| 6,640,835 B1 | 11/2003 | Rohrberg et al. | |
| 6,644,353 B1 | 11/2003 | Eidsmore | |
| 6,874,538 B2 | 4/2005 | Bennett | |
| 7,225,835 B2 * | 6/2007 | Vu | 137/884 |
| 7,258,139 B2 | 8/2007 | Perusek et al. | |
| 7,334,605 B2 | 2/2008 | Vu | |
| 2002/0000256 A1 * | 1/2002 | Eidsmore et al. | 137/884 |

FOREIGN PATENT DOCUMENTS

| | | |
|---|---|---|
| EP | 715112 | 6/1996 |
| EP | 754896 | 1/1997 |
| EP | 816731 | 1/1998 |
| EP | 837278 | 4/1998 |
| EP | 844424 | 5/1998 |
| EP | 845623 | 6/1998 |
| EP | 859155 | 8/1998 |
| EP | 877170 | 11/1998 |
| EP | 905383 | 3/1999 |
| EP | 908929 | 4/1999 |
| EP | 1239203 | 9/2002 |
| JP | 2001-153289 | 6/2001 |
| JP | 2001-280595 | 10/2001 |
| WO | WO 99/45302 | 9/1999 |
| WO | WO 99/59392 | 11/1999 |
| WO | WO 01/42694 | 6/2001 |
| WO | WO 2004/048784 | 6/2004 |

OTHER PUBLICATIONS

International Preliminary Examination Report from PCT/US03/37460, mailed Mar. 14, 2005.

Examination report from British Application No. 0511669.4, mailed May 3, 2006.

Search report from British Application No. 0623962.8, mailed Feb. 9, 2007.

Office Action dated Mar. 14, 2008 from U.S. Appl. No. 11/928,271.

Office Action dated Mar. 19, 2008 from U.S. Appl. No. 11/931,126.

* cited by examiner

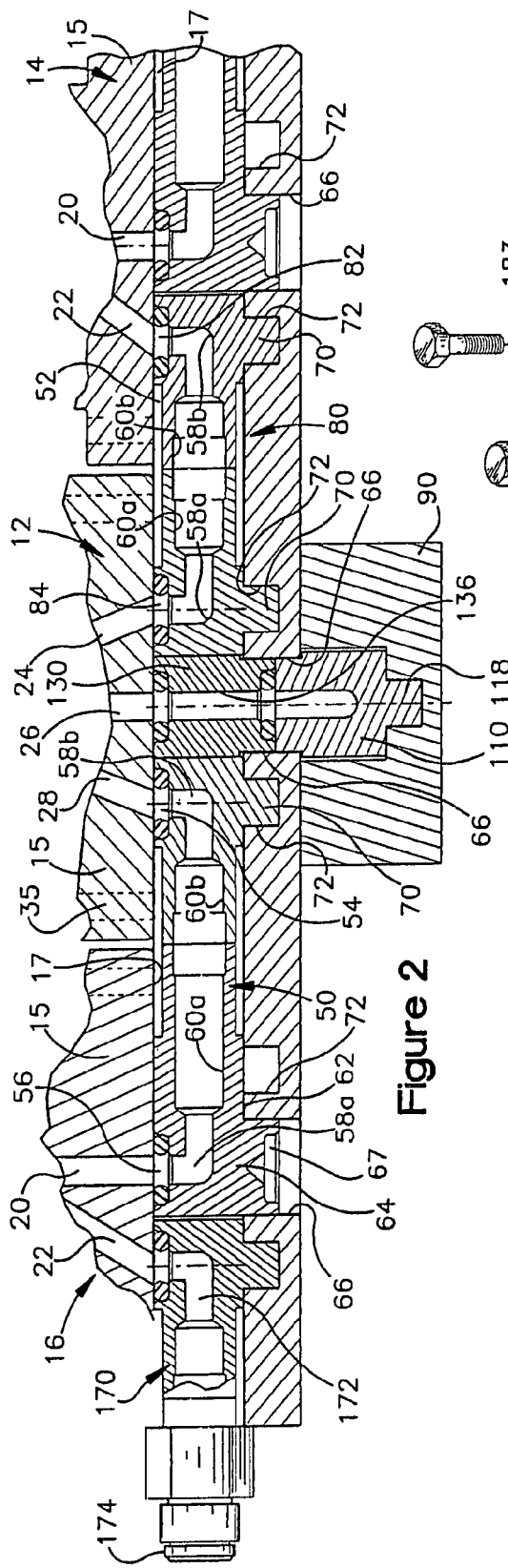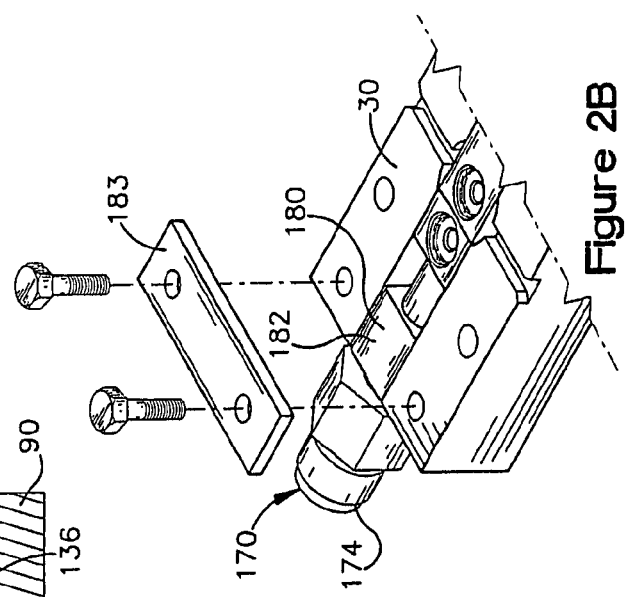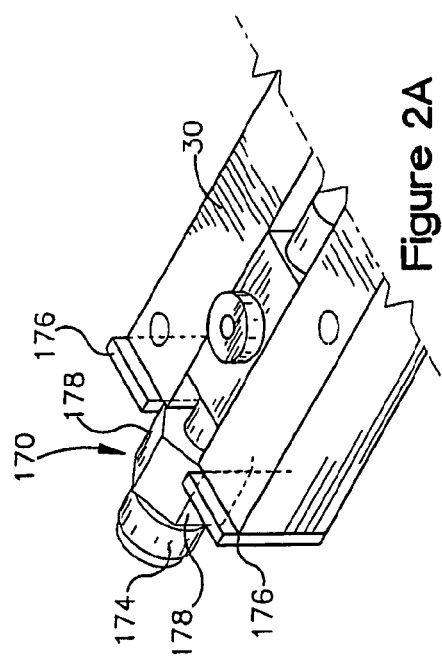

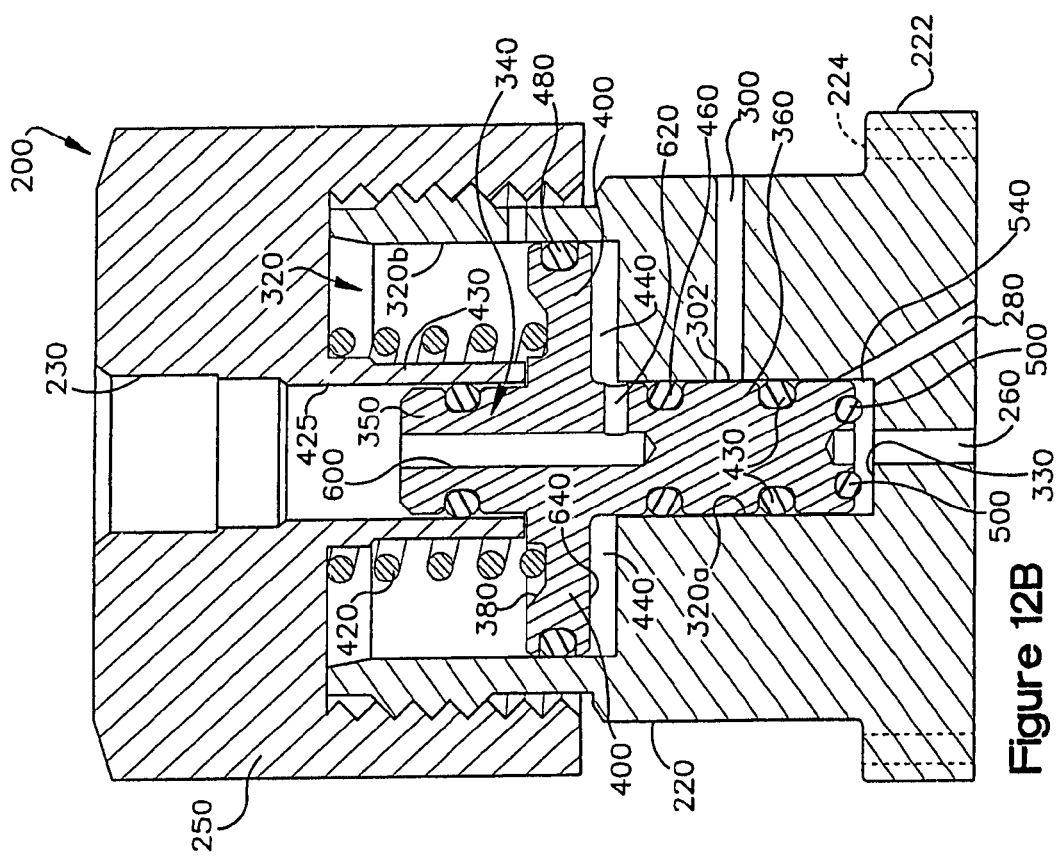
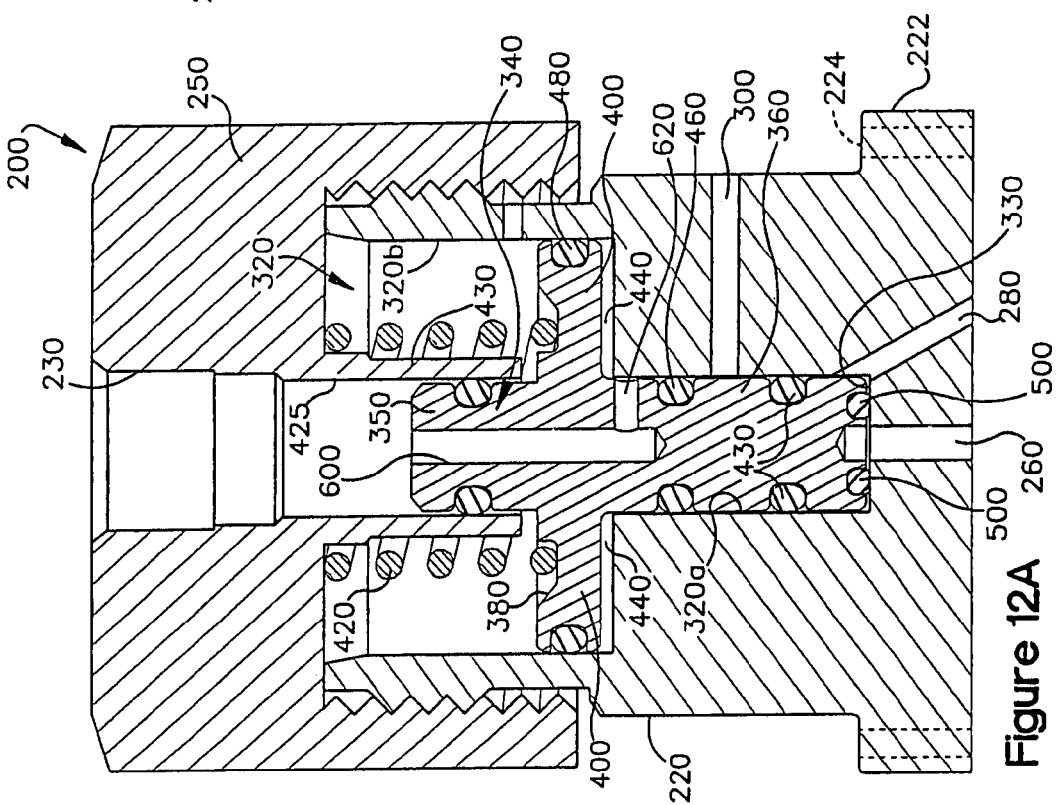

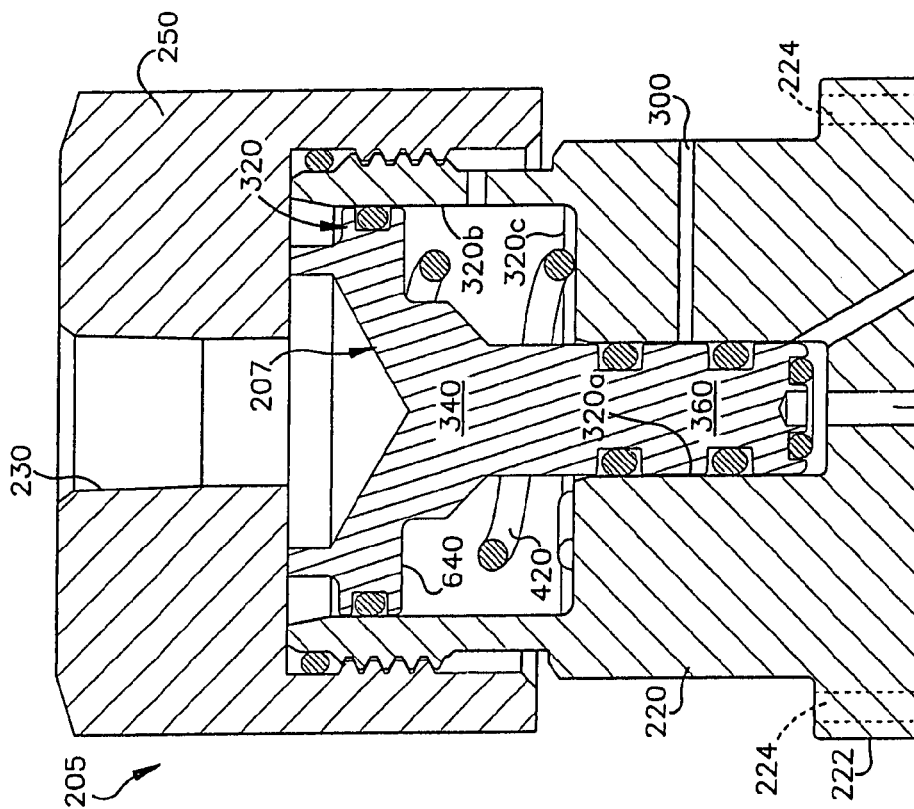
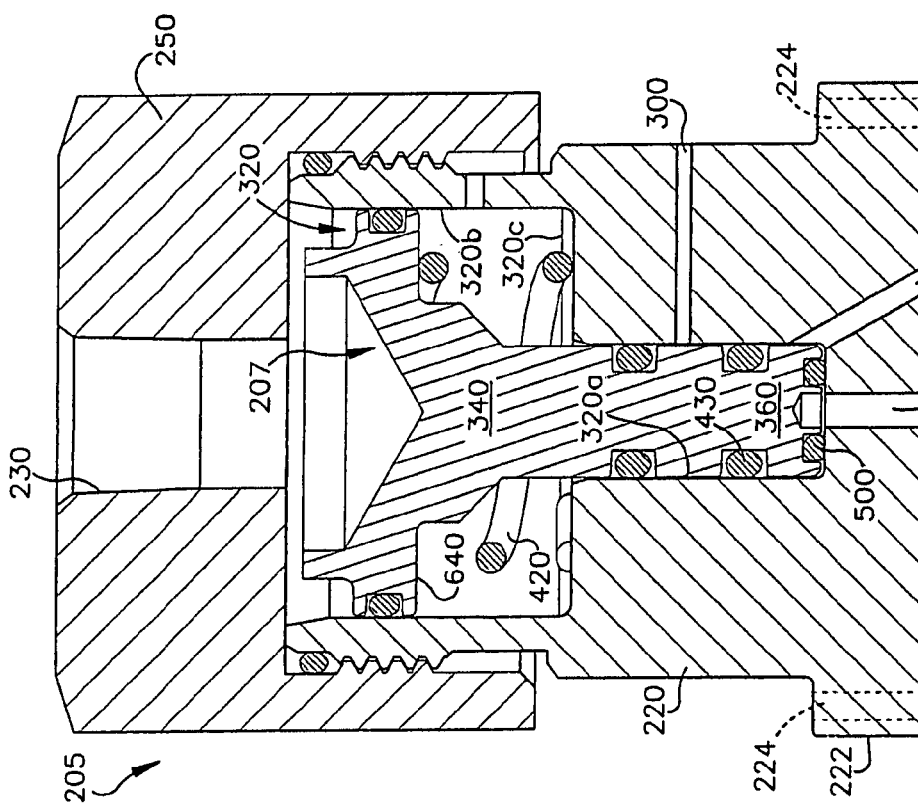

MODULAR SURFACE MOUNT FLUID SYSTEM

PRIORITY CLAIM

This application is a divisional of U.S. application Ser. No. 10/721,312, filed on Nov. 25, 2003 now U.S. Pat. No. 7,258,139 entitled Modular Surface Mount Fluid System which claims the benefit of U.S. provisional application Ser. No. 60/429,088, filed on Nov. 26, 2002 entitled Modular Surface Mount Manifold System and U.S. provisional application Ser. No. 60/433,371, filed on Dec. 13, 2002 entitled Modular Surface Mount Fluid System. The entire disclosures of the aforementioned patent applications are all fully incorporated by reference herein.

FIELD OF THE INVENTION

The inventions disclosed herein relates in general to manifolds and valves for fluid systems.

BACKGROUND OF THE INVENTION

Various industrial manufacturing processes often require the use of gasses and fluids which are controlled by systems made up of valves, regulators, pressure transducers, mass flow controllers and the like. These components are typically connected together by the use of welded tubing and compression fittings and mounted on a vertical panel. These type of connections may be undesirable in some applications because they add additional time and cost for welding operations, unnecessary space between components and make it difficult to replace a component located between other components. Further, these systems are typically custom designed and manufactured which make the manufacturing costs and procurement of replacement parts quite expensive.

New modular fluid systems have been recently introduced into the semiconductor industry in order to overcome these type of problems. Typical components of these systems such as valves, pressure regulators and other typical fluid components have been reconfigured so that their inlet and outlet ports are co-located in a coplanar configuration. Further, the attachment flow component flange has a standard size and shape in order to permit interchangeability of surface mount components. However, these fluid systems have the disadvantage of being very expensive because they are machined from high purity metal stock. These systems further require the use of metal seals, which are very expensive. Thus it is desired to provide an inexpensive modular manifold system for use for example, in the analytical process industry.

Other features and advantages of the invention will become apparent from the following detailed description, with reference to the accompanying drawing and claims, which form a part of the specification.

SUMMARY OF THE INVENTION

In an inventive aspect of the present application, a bridge fitting may be configured to communicate fluid in a modular fluid system from a flow component in a first layer or substrate layer to a flow component in a second layer or manifold layer. In one embodiment, a bridge fitting for use with two or more surface mounted components includes a housing having at least a first port disposed on a first side of the housing, at least a second port non-coaxial with the first port and disposed on a second side of the housing opposite the first side of the housing, and an internal fluid passageway connecting the first and second ports. The internal fluid passageway is configured to limit fluid flow within the bridge fitting to a single path between the first and second ports.

In another inventive aspect of the present application, a bridge fitting configured to communicate fluid in a modular fluid system from a first layer to a second layer may include recessed cavities for receiving seal components, such as, for example, gaskets or 0-rings. In one embodiment, a bridge fitting for use with two or more surface mounted components includes a housing having a first port disposed on a first planar surface of the housing, a second port disposed on a second planar surface of the housing opposite the first planar surface of the housing, and an internal fluid passageway connecting said first and second ports. Each of the first and second ports includes a sealing surface recessed from the corresponding one of the first and second planar surfaces.

BRIEF DESCRIPTION OF THE DRAWINGS

FIG. 2 is a cross-sectional view in the direction 2-2 of the fluid system of FIG. 1;

FIG. 2a is a partial, perspective view of an end connector and manifold block;

FIG. 2b is a partial, exploded view of an alternate embodiment of an end connector and manifold block;

FIGS. 12A and 12B are cross-sectional views of a top ported normally closed valve of the present invention shown in the closed and open positions, respectively;

FIGS. 13A and 13B are cross-sectional views of a top ported normally open valve of the present invention shown in the closed and open positions, respectively;

DETAILED DESCRIPTION

The present invention is directed to a modular surface mount fluid system and surface mount modular flow valves for use therewith. The modular surface mount fluid system is described in detail in Section I, while the surface mount modular flow valves are described in more detail in sections II and III.

Modular Surface Mount Fluid System

Figure 1:
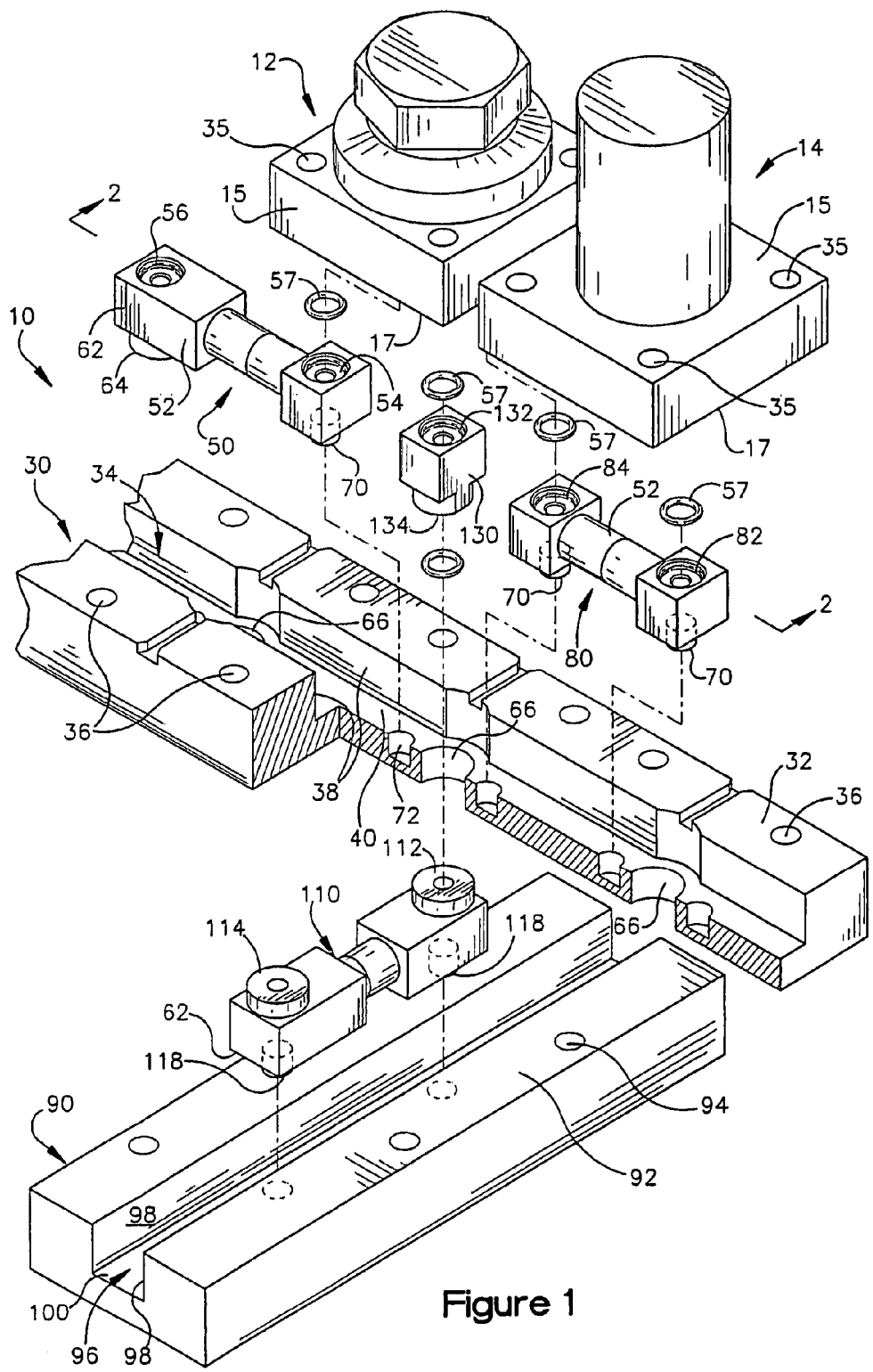
FIG. 1 is a perspective exploded view of the modular fluid system of the present invention.

Referring now to FIG. 1, an exploded view of an exemplary modular fluid system 10 is shown for use with surface mount fluid components such as valve 12 and filter 14. Other fluid components such as pressure transducers (not shown), mass flow controllers (not shown) and the like may also be utilized in conjunction with the modular manifold system of the invention. As shown in FIGS. 1 and 2, the surface mount components 12, 14, 16 each have a square mounting flange 15 of a standard size with at least one inlet port and at least one outlet port located adjacent the inlet port. The inlet/outlet ports are located on the bottom planar mounting surface 17 of the mounting flange 15. For two port components such as filter 14 and generic two-port valve 16, an inlet port 20 is located at the center of the bottom planar mating surface 17 of the mounting flange, and an offset outlet port 22 is located adjacent the inlet port 20. For the generic three-port valve 12, the inlet port 24 is offset from the center, and further comprises a center oriented inlet (or outlet) port 26 and an offset outlet port 28. Note that all of the inlet/outlet ports are coplanar.

As shown in FIGS. 1 and 2, the substrate or first layer of the fluid system 10 comprises one or more substrate channel blocks 30. The substrate channel blocks 30 may be sized to receive one or more surface mount flow components. Preferably, the substrate channel block 30 receives a plurality of surface mount flow components. The substrate channel block 30 comprises an upper planar mounting surface 32 for receiving and securing the surface mount components thereon, and a channel or groove 34 oriented along the longitudinal axis of the channel block for receiving two or more bridge fittings. A series of threaded fasteners (not shown) may be inserted through holes 35 in the base mounting flanges of the fluid components in order to secure the components to aligned threaded holes 36 of the substrate channel block 30. The groove or channel 34 preferably has parallel side walls 38 and a bottom wall 40 perpendicularly oriented to each of the side walls.

The modular fluid system 10 of the present invention further includes one or more bridge fittings which are received in the channel 34 of the substrate channel block 30. The bridge fittings 50, 80, 110, 130, 140, 150, 160 as shown in FIGS. 1 through 5, function to "bridge the flow", i.e., provide fluid communication from one flow component to other adjacent flow component(s). The bridge fittings may also provide fluid communication from a flow component in a first substrate layer to a flow component in a second substrate layer. The external shape of the bridge fittings further provide for a locating feature to prevent mis-assembly as well as a clip or retaining feature in order to retain the bridge fittings within the channel blocks when mounted in a vertical orientation. All of these features will be described in more detail, below.

As shown in FIG. 2, a first type of bridge fitting 50 referred to as an "offset-center" bridge fitting communicates fluid flow between an "offset" oriented port 28 of a first flow component 12 and a "center" located port 20 of a second, adjacent flow component 16. For the vast majority of two port fluid components, the offset oriented port 22 is typically the outlet, and the center oriented port 20 is typically the inlet. The offset-center bridge fitting 50 includes a housing 52 having a first or "offset" port 54 and a second or "center" port 56 located on the upper surface of the housing. The offset port 54 of the bridge fitting is positioned for fluid communication with the offset port 28 of a first fluid flow component 12, while the center port 56 of the bridge fitting is positioned for fluid communication with the center port 20 of a second, adjacent fluid flow component 16. As shown in FIG. 2, when the bridge fitting 50 is received within the channel of the substrate block 30, the first and second ports 54, 56 are flush with respect to the substrate channel mounting surface 32. The first and second ports preferably comprise a circular recessed cavity or counterbore about the port hole opening for receiving a gasket or O-ring seal 57. The seals may be made of any suitable material such as elastomer, plastic, rubber or polymer material. Other seal technologies which may used in conjunction with the invention will be readily apparent to those of ordinarily skill in the art.

The first and second ports 54, 56 of the bridge fitting are each connected to elbow shaped internal fluid passageways 58a, 58b. Extending from the elbow shaped internal fluid passageways 58a, 58b are optional straight flow passageways 60a, 60b which are joined together. Thus the elbow shaped internal fluid passageways 58a, 58b and the straight flow passageways 60a, 60b cooperate to form a U-shaped internal fluid passageway.

In order to ensure the proper location of the center port of the bridge fitting 50 with the center oriented orifice 20 of the flow component 16 as well as a manifold bridge fitting in a second layer, an enlarged boss 64 extends from the bottom surface 62 opposite the center port 56 of the offset-center bridge fitting 50. The enlarged boss 64 is aligned for reception in a drop down hole 66 located in the bottom wall 40 of the channel block 30, thereby providing alignment of the center port 56 of the bridge fitting 50 with the center port 20 of the surface mount component 16 and potentially a port of a bridge fitting located in a second or manifold layer (not shown). The depth and diameter of the boss 64 is sized to retain the bridge fitting within the channel when the channel block 30 is rotated into a vertical orientation. When the channel block 30 is in a vertical orientation, the sidewall of the boss interferes with the sidewall of the hole 66 in such a manner so as to retain the bridge fitting within the channel. Further, the diameter of the boss 64 is sized to be only slightly smaller than the hole 66, in order to further aid in the retention of the boss within the hole 66. Boss 64 may further comprise a blind recessed area 67 for insertion of a gasket so that the boss end can function as a cap to seal off flow of a mating port 112 of a manifold bridge fitting located in a manifold layer, as described below.

The offset center bridge fitting 50 may further comprise a second boss 70 extending from the bottom surface opposite the offset port 54. The second boss 70 is preferably a different size than the first boss 64, and is received in a complementary shaped blind hole 72 in alignment with the offset port location 28 of the surface mount component 12. When the second boss 70 has a different size or shape than the first boss 64, the bosses 64, 70 will only fit in their respective holes 66, 72. As shown in the cutaway portion of the channel block 30, the channel block has a series of holes in a repeating pattern: counter bore 72, through hole 66, counter bore 72. The counter bore holes 72 align with the offset valve ports 22, while the through holes 66 align with the center valve ports 20. Thus the placement and size of the channel block holes together with the different sized (or shape) bosses align the respective offset, center ports of the bridge fitting and valves, thereby preventing the mis-assembly or improper location of the bridge fittings within the channel block.

Thus the first and second bosses 64, 70 function to provide alignment of the offset port 54, and the center port 56 of the bridge fitting 50 with the corresponding offset port 28, and center port 20 of the surface mount components 12, 16, respectively. The first and second bosses 64, 70 further function to retain the bridge fitting 50 within the channel when the channel block is held vertically, eliminating the need for separate retaining clips.

A second embodiment of the bridge fitting 80 is also shown in FIGS. 1 and 2 and is referred to as an "offset-offset" bridge fitting. The offset-offset bridge fitting communicates fluid flow between an "offset" oriented port 22 of a first flow component 14 and an "offset" located port 24 of a second, adjacent flow component 12. Unless if indicated below, the offset-offset bridge fitting 80 has the same features as the offset-center bridge fitting 50 described above. The offset-offset bridge fitting 80 includes a housing 52 having a first offset port 82 and a second offset port 84 located on the upper surface of the housing. The first offset port 82 of the bridge fitting 80 is positioned for fluid communication with the offset port 22 of a first fluid flow component 14, while the second offset port 84 of the bridge fitting is positioned for fluid communication with the offset port 24 of a second, adjacent fluid flow component 12.

In order to ensure the proper location of the offset-offset bridge fitting 80 within the channel 34 of the substrate channel block to prevent mis-assembly, a first and second boss 70 extend from the bottom surface 62 opposite each offset port 82, 84 of the offset-offset bridge fitting 80. The bosses 70 are aligned for reception in complementary-shaped blind holes 72, which are in alignment with the offset port locations 22, 24 of the surface mount components 12, 14. Thus as described above, the bosses 70 function to retain the bridge fitting 80 within the channel when the channel block is held vertically, as well as align the bridge fitting ports with the offset ports of the surface mount components.

The modular manifold system 10 may further optionally comprise a second layer comprised of one or more manifold channel blocks 90 of varying lengths and one or more bridge fittings. The manifold channel blocks 90 have an upper mounting surface 92 for securing to the lower surface of the substrate channel blocks 30 via fasteners (not shown) which are positioned within holes of the upper channel blocks (not shown) and into aligned holes 94 of the lower channel blocks 90. This allows the channel blocks 90 to be disconnected from the upper substrate layer and slid out from below, allowing for easier accessibility. As shown in FIG. 1, the manifold channel blocks 90 are generally oriented in a direction perpendicular to the longitudinal axis of the substrate layer.

The manifold channel block 90 further comprises a channel or groove 96 for the reception of one or more manifold bridge fittings 110. The groove or channel 96 preferably has parallel side walls 98 and a bottom wall 100 perpendicularly oriented to each of the side walls. The manifold bridge fittings 110 are essentially identical to the bridge fitting 50 except for the following features. The manifold bridge fitting 110 has a first port 112 and a second port 114 and a boss extending about each of said ports 112, 114, which are aligned for reception into drop down holes 66 located in the upper channel block 30 of the first substrate layer. The manifold bridge fitting 110 further optionally comprises one or more mounting pins 118 extending from the lower surface 62 which are aligned for reception into blind holes 120 located in the bottom wall 100 of the channel block 90. The blind holes together with the mounting pins function to properly align the manifold bridge fitting ports 112, 114 with a port 132 of a drop down bridge fitting 130, and to retain the bridge fitting within the manifold channel block.

The drop down bridge fitting 130 has a first port 132 and a second port 134 opposite the first port, with each of the ports connected together with a straight through flow path 136. Each of the first and second ports 132, 134 further comprise a recessed area or counterbore for receiving a gasket 57 therein. The drop down bridge fitting functions to communicate fluid between a center port 26 of a surface mount flow component 12 in the upper substrate layer to a port 112 of a manifold bridge fitting in the lower manifold layer. For example, purge gas may be routed up from the manifold bridge fitting to the three port valve. Alternatively, flow may be directed from the first layer to the second layer depending upon the valve setting.

Figure 3:
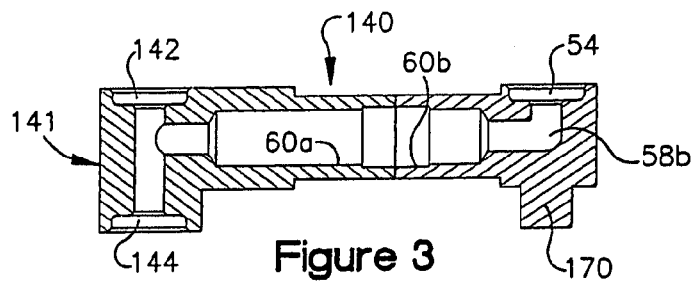
FIG. 3 is a cross-sectional view of an alternate embodiment of an offset-center bridge fitting.

A second embodiment of a center-offset bridge fitting 140 is shown in FIG. 3, and which may be used in place of the center-offset bridge fitting 50. The center-offset bridge fitting 140 is the same as bridge fitting 50, except that the left-hand side of the fitting (the elbow fitting) has been modified into a T fitting 141 having a first port 142 and a second port 144 directly opposite the first port. Thus, if the center-offset bridge fitting 140 were substituted for the center-offset bridge fitting 50 in FIG. 2, fluid may communicate between adjacent fluid components 12, 16 and between the upper substrate layer and the lower substrate layer.

Figure 4A:
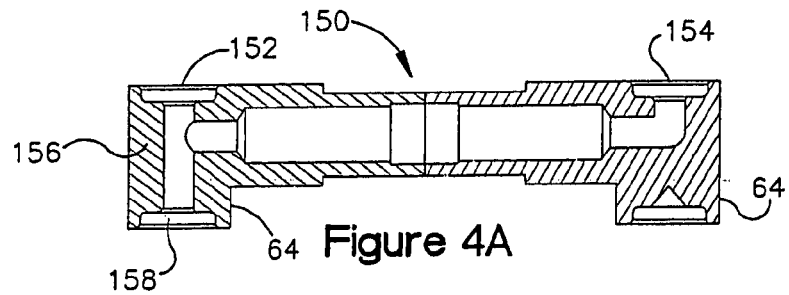
FIGS. 4A and 4B are cross-sectional views of an alternate embodiment of a center-center bridge fitting.
Figure 4B:
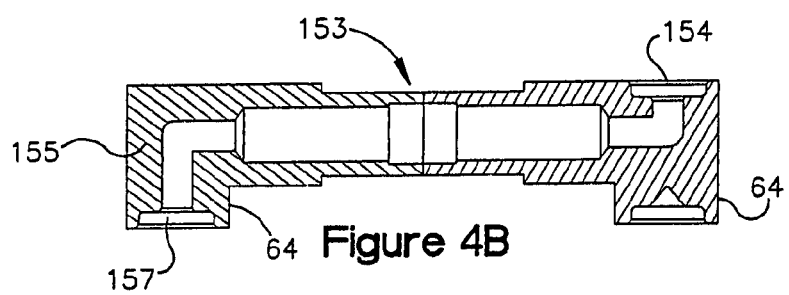

FIG. 4A illustrates yet another embodiment of a bridge fitting denoted as a "center-center" bridge fitting 150 because each port 152, 154 is aligned for mating with a center port of a surface mount component. Opposite each port 152, 154 are center port alignment bosses 64. The left hand side of the fitting has a T fitting 156 having a first port 152 and a second port 158 directly opposite the first port. Thus the center-center bridge fitting 150 communicates fluid between the center port of a surface mount component, the center port of a second, adjacent fluid component and the port of a manifold bridge fitting located in the manifold layer. FIG. 4B also illustrates a center-center bridge fitting 153, however the left hand side of the fitting has an elbow 155 instead of a T fitting. Thus bridge fitting 153 communicates fluid from the substrate layer to the manifold layer.

Figure 5A:
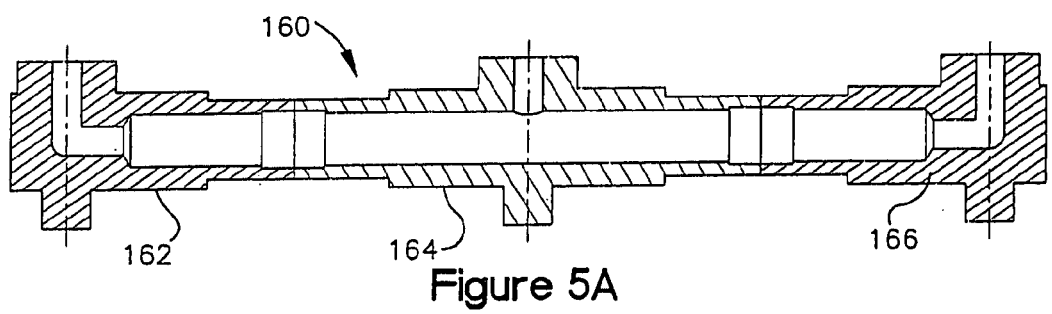
FIG. 5A is a cross-sectional view of alternate embodiments of a manifold bridge fitting.

FIG. 5A illustrates an alternate embodiment of a manifold bridge fitting 160. The manifold bridge fitting 160 comprises an elbow fitting 162 connected to a Tee fitting 164 which is connected to an elbow fitting 166. The manifold bridge fitting comprises three ports aligned for fluid communication with a port of a bridge fitting located in the upper substrate layer such as a port 134 of a drop down fitting 130, or a blind port 67 of a center offset fitting.

Figure 5B:
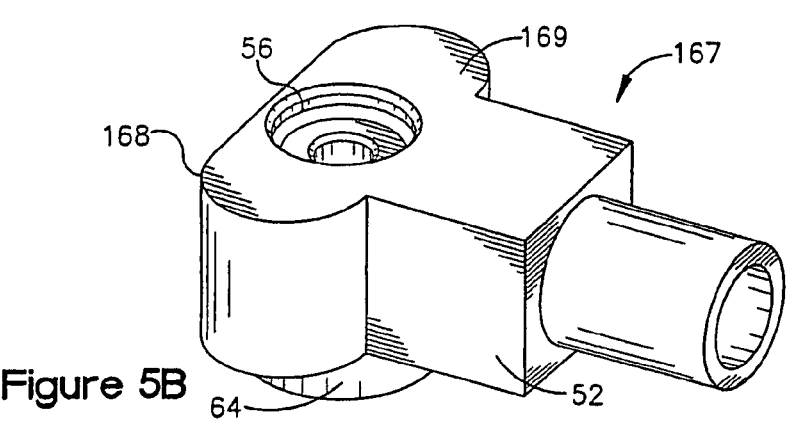
FIGS. 5B, 6 are top and partial views of additional embodiments of a bridge fitting.

FIG. 5B illustrates one end of an alternate embodiment of a bridge fitting 167. The bridge fitting 167 comprises a first projection 168 which extends from the sidewall of the housing. The first projection is shaped as a half-circle. The bridge fitting 167 may also comprise a second projection 169 which extends from the sidewall of the housing, which may also be shaped as a half-circle. The first and second projections 168, 169 may also comprise any desired shape. The channel block sidewall 38 further comprises slots sized to receive either the first projection, the second projection, or both (not shown). The slots are located in the appropriate location to align the ports of the bridge fittings with the appropriate port of the surface mount component. The projections together with the slots function to prevent mis-assembly of the system as well as retain the bridge fitting within the channel when mounted in a vertical orientation.

Figure 6:
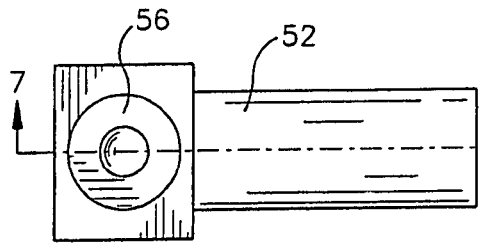
Figure 8:
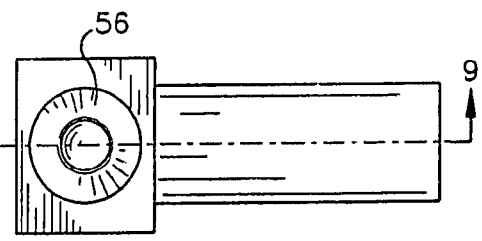
FIG. 8 is a top, partial view of an alternate embodiment of a bridge fitting.
Figure 7:
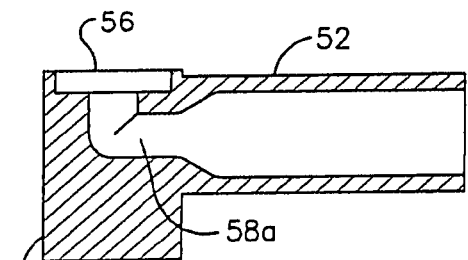
FIG. 7 is a side, cross-sectional view of the bridge fitting of FIG. 6.
Figure 9:
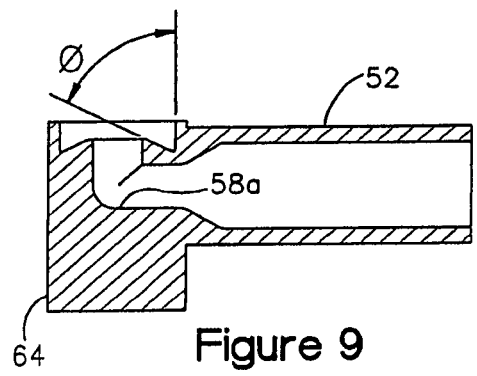
FIG. 9 is a side, cross-sectional view of the bridge fitting of FIG. 8.
Figure 10:
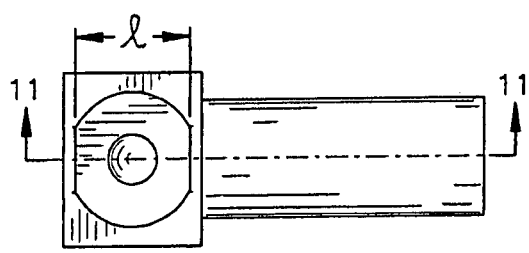
FIG. 10 is a top, partial view of an alternate embodiment of a bridge fitting.
Figure 11:
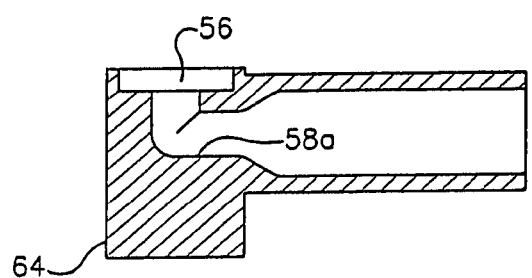
FIG. 11 is a side, cross-sectional view of the bridge fitting of FIG. 10.

FIG. 6 illustrates a close up top view of a port of a bridge fitting. In order to retain a standard O-ring within the counterbore when the bridge fitting is inverted, the diameter of the counterbore may be slightly smaller than the diameter of the O-ring. For example, if a diameter of the O-ring is 0.260, the diameter of the counterbore would be about 0.244. Another option is shown in FIG. 9, where the counterbore has an angle θ in the range of about 60 to about 70 degrees. For example, if a diameter of the O-ring is 0.260, the diameter of the counterbore would be about 0.244. Thus the counterbore diameter may be smaller than the standard O-ring yet allow room for the gasket to flow during compression. As shown in FIG. 10, the counterbore has flat sidewalls spaced apart a distance 1 which is less than the diameter of the gasket. For example, for a standard 006 gasket having an approximate 0.260 diameter, the counterbore diameter could be 0.280 while distance 1 is 0.244. Thus the flat sidewalls squeeze the gasket and retain it when the bridge fitting is inverted, while the non-flat portion of the counterbore allows the gasket to flow therein when the gasket is under compression.

As shown in FIGS. 1-5, the above described bridge and manifold fittings may be machined from two or more separate components and then welded or otherwise joined together. Alternatively, the bridge fitting may be integrally formed using metal injection molding or other techniques known to those skilled in the art. It is preferred that the above described bridge and manifold fittings be comprised of stainless steel such as 316 and the channel blocks 30, 90 be comprised of aluminum, although any suitable material such as aluminum, plastic or metal would work for the invention purposes.

Figure 16A:
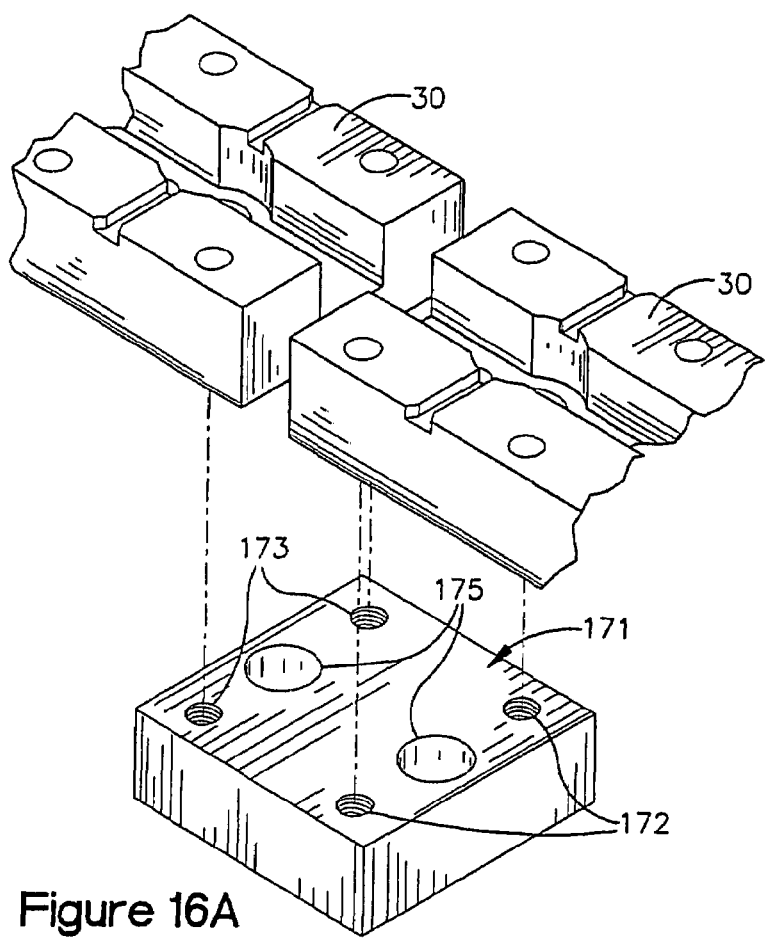
FIG. 16A is a perspective exploded view of a connector mounting block shown together with two channel blocks.
Figure 16B:
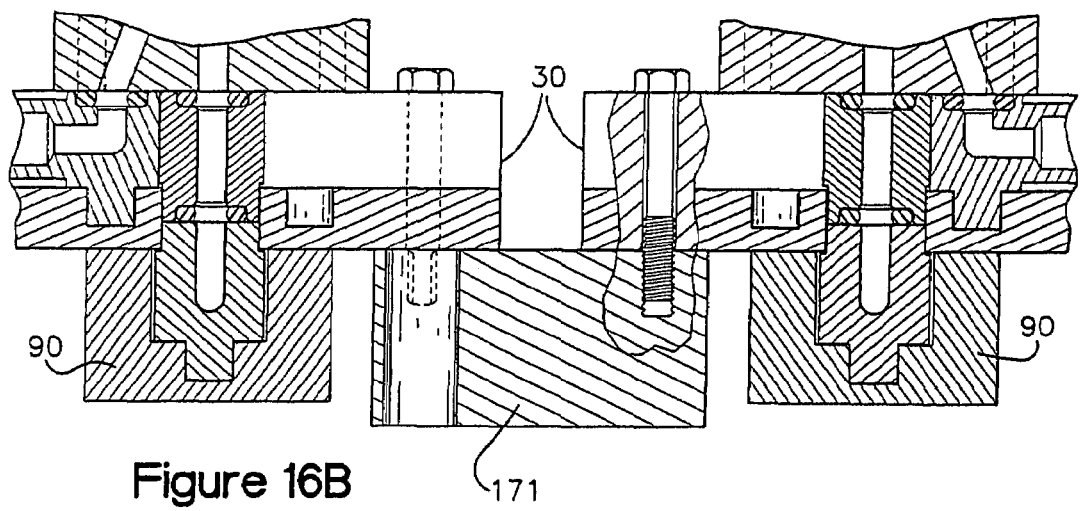
FIG. 16B is a cross-sectional view of an assembled connector mounting block and channel block system of FIG. 16A.

FIGS. 16A and 16B illustrate a connector block 171 which may be used for joining two channel blocks 30 together while maintaining the spacing of the surface mount components. The connector block has a plurality of threaded holes 173 for receiving fasteners for connecting the respective end of a channel block 30 to the connector block 171. The connector block 171 further comprises counterbores 175 which receive fasteners for mounting the connector block upon a base plate (not shown).

As shown in the FIGS. 2, 2A and 2B, the modular system 10 may also comprise end fittings 170, which comprise an elbow fitting 172 having a 90 degree internal passageway connected to a standard tube fitting 174 or other suitable fitting for connecting with a fluid line. The end fitting may be utilized as an inlet fitting or an outlet fitting which mates with the fluid line (not shown). Thus, the outlet or inlet end of the elbow fitting is connected to the respective inlet or outlet end of a fluid component. FIGS. 2A and 2b further illustrate details of the end fittings and manifold blocks designed to prevent torque from being transmitted to the end fittings 170 when the manifold system is assembled. As shown in FIG. 2A, two rectangular plates 176 are welded onto the channel block forming a slot for receiving the aligned flats 178 of a hexagonal nut, thereby preventing the nut from rotation. Alternatively, the slot may be integrally formed in the channel block. As shown in FIG. 2B, the end fitting preferably has a boss 180 located behind the hex nut. The boss 180 has flats 182 located on the top and bottom or a square cross section so that rotation of the boss is prevented when the end fitting is inserted in the channel. The boss may further be secured in the channel via lock down bar 183.

Modular Flow Control Valve

A normally closed modular flow control valve 200 of the present invention is best shown in FIGS. 12A and 12B. The valve 200 comprises a body 220 having a flanged lower end 222 with one or more holes 224 for mounting the valve 200 to a manifold block or substrate via mounting bolts (not shown), and an upper end for receiving a cap 250. Preferably, the flanged lower end 220 is generally square in shape and has dimensions on the order of about 2 inches by 2 inches. The body 220 further comprises an inlet fluid passageway 260, an outlet fluid passageway 280, and a vent fluid passageway 300. The body 220 further comprises an internal cavity 320 having a first narrow portion 320a which is in fluid communication with the inlet passageway 260, the outlet passageway 280 and the vent passageway 300.

A T-shaped stem 340 is axially disposed within the cavity 320. The stem 340 further comprises a lower stem portion 360 which is received in the first narrow portion of the cavity 320a. The stem 340 further comprises an actuator piston 400 formed by the enlargement of the width of the stem which is received in a second larger diameter portion 320b of the cavity. The stem is biased into the closed position by the downward force of a spring 420. The spring 420 is housed in a groove 370 of the upper surface 380 of the piston 400 and an inner surface of the cap 250, and around a sleeve 425 of the cap 250. The upper T section 350 of the stem is mounted within the sleeve 425 of the cap.

The valve 200 is in the closed position when the stem 340 is at its extreme lower position as shown in FIG. 12A. The valve is in the open position when the stem is at its extreme upper position as shown in FIG. 12B. When the valve is in the closed position, fluid communication from the fluid inlet passageway 260 is blocked by O-rings 500 seating against the cavity wall 330. When the valve is in the open position, the inlet passageway 260, the outlet passageway 280 and a first fluid compartment 540 are all in fluid communication. The first fluid compartment 540 is formed by the annulus between the stem lower portion 360 and the inner cavity wall 320 from the lower surface of the cavity 330 to the second O-ring 430.

The internal actuator of the valve 200 comprises the piston 400 and an actuator fluid compartment 440. The actuator fluid compartment 440 is formed by the annulus between the stem 340 and the inner cavity wall 320 from the third O-ring 460 to the fourth O-ring 480. The stem 340 further comprises an internal longitudinal bore 600 connected to a radial passageway 620, so that fluid may communicate through the stem 340 and into the actuator fluid compartment 440. When an external source of pneumatic pressure is supplied through an internal bore 230 of the cap 250 to the internal passageway 600, fluid is communicated to the radial passageway 620 and to the actuator fluid compartment 440, resulting in pneumatic pressure being applied to the lower surface 640 of the actuator piston 400 so that the downward force of the spring 420 is overcome, lifting the stem to the open position. When the valve is in the open position, fluid may communicate from the inlet passageway 260 to the outlet passageway 280.

The valve body 200 further comprises a vent compartment 302 formed by the annulus between the stem and the inner surface 320a of the cavity from the second O-ring 430 to the third O-ring 460. A vent passageway 300 provides fluid communication from the vent compartment and an environment external of the passageway.

A second embodiment of a modular surface mount valve having a normally open configuration is shown in FIGS. 13A and 13B. The valve 205 is the same as valve 200 except for the following differences. The shape of the stem 340 has been changed slightly to resemble an upper case "T" as opposed to a lower case "t", and further comprising a cavity along the upper surface of the T. The sleeve 425 of cap 250 has been eliminated and the spring 420 has been relocated to between the lower wall 320c of the cavity 320 and the lower surface 640 of the stem 340. Spring 420 biases stem 340 into the normally open position. In order to actuate the valve 205, an external source of pneumatic pressure is supplied through the internal bore 230 of the cap 250 to cavity 207 located upon the upper surface of the stem, resulting in pneumatic pressure being applied to the upper surface of the actuator piston so that the force of the spring 420 is overcome, pushing the stem to the closed position as shown in FIG. 13A. When the pneumatic pressure supply is turned off, the valve returns to its normally open position as shown in FIG. 13B, and fluid may communicate from the inlet passageway 260 to the outlet passageway 280.

Modular Surface Mount Check Valve

Figure 14:
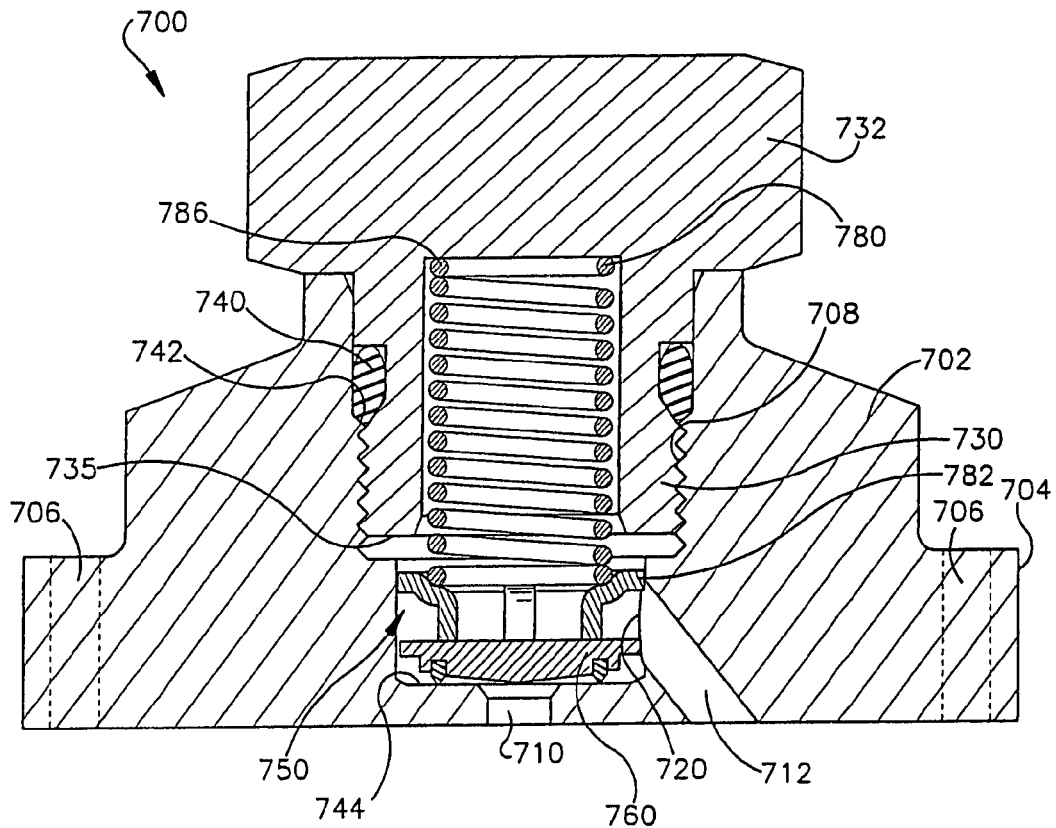
FIG. 14 is a cross-sectional view of a check valve of the present invention shown in the closed position.
Figure 15:
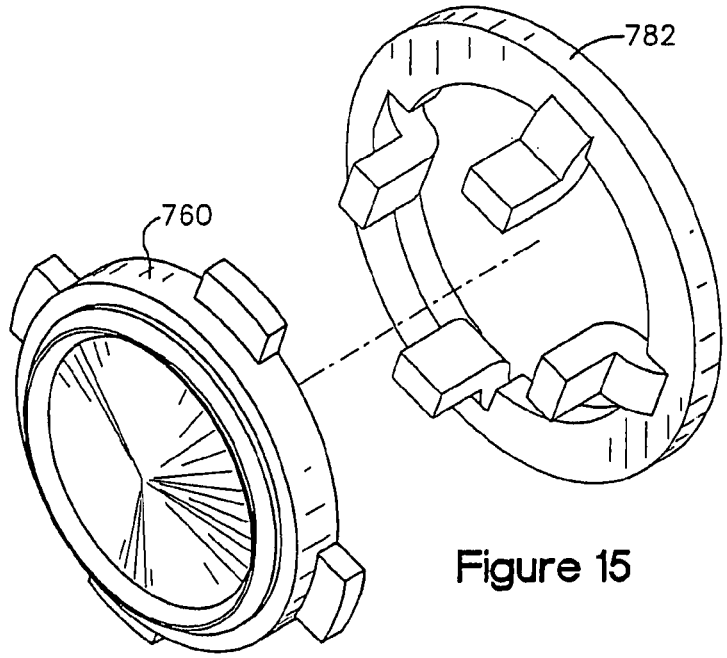
FIG. 15 is a perspective exploded view of the poppet of the valve of FIG. 14.

A second embodiment of a modular surface mount valve is shown in FIG. 14. The check valve 700 includes a body 702 having a flanged lower end 704 with mounting holes 706 for receiving fasteners (not shown) for securing the valve body to a modular surface mount manifold (not shown). The valve body 702 includes an axially oriented inlet passageway 710, and an offset outlet passageway 712. The valve body 702 further includes an inner axially oriented bore 720 which is in fluid communication with the inlet passageway 710 and the outlet passageway 712 when the valve is in the open position, as described in more detail, below.

The valve body 702 further includes an upper mounting flange 708 disposed about the opening of the inner bore 720 for receiving a male end 730 of a cap 732. The male end of the cap and the inner bore wall are joined in a sealed relationship such as by suitable threads. An O-ring or gasket 740 is preferably mounted in a groove 742 of the male end of the cap for sealing engagement with the inner bore wall 720.

The valve body inner bore 720 has a transverse planar wall forming a valve seat 744. A valve chamber 750 is defined by the valve seat 744 and the lower end portion of the male end of the cap 732. Mounted within the valve chamber 750 for cooperation with the valve seat 744 is a poppet 760. Poppet 760 is preferably a planar disk element. The poppet 760 is biased into engagement with the valve seat 744 via spring 780 acting through a poppet stop 782. The poppet stop 782 includes an outer annular rim portion which has an outer diameter slightly less than the diameter of the bore. One end 784 of the coil spring 780 is mounted to the outer annular rim portion of the poppet stop 782 while the second end 786 is mounted within the bore of the cap. The poppet and poppet stop may comprise the poppet and poppet stop embodiments described in U.S. Pat. No. 4,637,430, the entirety of which is hereby incorporated by reference.

The valve is moved from the closed position as shown in FIG. 14 to the open position when the higher fluid pressure overcomes. the force of the spring 780. The vertical travel of the poppet 760 is limited by the engagement of the poppet stop 782 with the male end 735 of the cap 732, thereby forming a stop.

The preferred form of the valves and manifold system of the invention has been shown and described above. However, with the present disclosure in mind it is believed that obvious alterations to the preferred embodiments, to achieve comparable features and advantages in other assemblies, will become apparent to those of ordinary skill in the art.

We claim:

1. A modular fluid system comprising:
   a first fitting comprising a housing including an upper side and an opposite lower side, the housing further comprising at least a first port disposed on the upper side of the housing, at least a second port non-coaxial with the first port and disposed on the lower side of the housing, and an internal fluid passageway connecting said first and second ports;
   a channel block having a groove for receiving said first fitting therein; and
   a second fitting separate from the first fitting, wherein the channel block groove comprises an opening configured to receive a boss extending about the second port of the first fitting and a boss extending about a port of the second fitting, such that the port of the second fitting is in communication with the second port of the first fitting.

2. The modular fluid system of claim 1, wherein the internal fluid passageway of the first fitting is configured to limit fluid flow within the first fitting to a single path between the first and second ports.

3. The modular fluid system of claim 2, wherein the internal fluid passageway of the first fitting comprises first and second elbow portions.

4. The modular fluid system of claim 1, wherein the first fitting further comprises a first locating feature and the channel block further comprises a second complementary shaped locating feature for engaging said first locating feature when the first fitting is assembled with the channel block.

5. The modular fluid system of claim 4, wherein the first locating feature is spaced apart from the internal fluid passageway of the first fitting.

6. The modular fluid system of claim 4, wherein the first locating feature comprises a projection and the second locating feature comprises a complementary shaped hole.

7. The modular fluid system of claim 4, wherein the first and second locating features are configured to prevent misassembly of the first fitting with the channel block.

8. The modular fluid system of claim 1, further comprising a surface mount fluid component assembled with the first port of the first fitting, such that the surface mount fluid component is in fluid communication with the second fitting.

9. The modular fluid system of claim 1, wherein the channel block opening is sized to align the port of the second fitting with the second port of the first fitting when the bosses are received in the opening.

* * * * *